United States Patent [19] [11] 4,375,062

Sturm [45] Feb. 22, 1983

[54] ASPIRATOR FOR AN INK JET PRINTER

[75] Inventor: Gary V. Sturm, Lexington, Ky.

[73] Assignee: International Business Machines Corporation, Armonk, N.Y.

[21] Appl. No.: 280,953

[22] PCT Filed: May 29, 1981

[86] PCT No.: PCT/US81/00722

§ 371 Date: May 29, 1981

§ 102(e) Date: May 29, 1981

[51] Int. Cl.[3] .......... G01D 15/18

[52] U.S. Cl. .......... 346/75; 346/140 R

[58] Field of Search .......... 346/75, 140 IJ

[56] References Cited

U.S. PATENT DOCUMENTS 4,097,872 6/1978 Giordano et al. .......... 346/75

4,297,712 10/1981 Lammers et al. .......... 346/75

*Primary Examiner*—George H. Miller, Jr.

*Attorney, Agent, or Firm*—William J. Dick

[57] ABSTRACT

Disclosed is the design for an aspirator (10) of a continuous stream ink jet printer. With reference to FIG. 1, the aspirator includes a tunnel configuration (20) wherein the tunnel cross-sectional area diverges from the inlet (23) to the outlet (22), the axial area gradient being inversely proportional to the intended velocity of air through the tunnel (20) so that the cross-sectional area of the outlet (22) is greater than the cross-sectional area of the inlet (23). In this manner, air movement through the tunnel (20) is substantially constant.

4 Claims, 5 Drawing Figures

ASPIRATOR FOR AN INK JET PRINTER

TECHNICAL FIELD

The present invention relates to continuous stream ink jet printers, and more particularly relates to an aspirator configuration for such printers.

STATE OF THE PRIOR ART

During the continuous ink jet printing process, charged ink droplets enter a strong electric field which accelerates them more or less proportionally to their charge. As the drops separate from interaction with the field, they follow a multiplicity of trajectories, staggered in time and position. At any instant, the drops respond to the vector sum of electric field and aerodynamic forces, as well as self weight due to gravity which is usually neglected because the mass of the individual droplets is small. As the drops change their relative positions, the vector sum of forces also changes with the effect of perturbing the drop trajectories. Empirical correction techniques which compensate for this drop interaction are complex if they are applicable to all possible drop patterns. For example, the IBM 6640 continuous stream ink jet printer employs a complex guard drop scheme such as illustrated in U.S. Pat. No. 4,086,601, issued on Apr. 25, 1978.

It is the purpose of aspiration to reduce the magnitude of inter-drop forces and simplify the drop placement logic which must adjust the individual drop charge to compensate for these perturbations.

In essence, aspiration attempts to directly minimize aerodynamic perturbations between the drops by surrounding them with a column of co-linearly moving air, the effect of which is to reduce the relative velocity of the drop with respect to its surroundings to a minimum. This results in reduced particle drag while minimizing the intensity of the momentum wake trailing the drop. As a consequence, the drops may traverse longer trajectories. By allowing the traversal of the drops in longer trajectories, electric field deflection efficiency is greatly enhanced and electrostatic inter-drop interaction is reduced because the actual charge applied to each drop by the charge electrode may be reduced.

In U.S. Pat. No. 3,596,275 to Richard B. Sweet, Jr. July 27, 1971, column 5, line 65 et seq there is a discussion of both co-linear or perpendicular aspiration. U.S. Pat. No. 3,972,051, Lundquist, et al., issued July 27, 1976, discloses a small air duct surrounding the ink stream so that the air is slowed as it approaches the paper. The relative velocity between the drops and the air is reduced, but minimization of air to ink drop velocity is not achieved and is in fact avoided in the exit of the air tunnel. In the Hendriks and Giordano, U.S. Pat. No. 4,097,872, issued on June 27, 1978, a structure is taught for reducing the overall stream turbulance and elimination of the wake associated with the drop source (such as illustrated in the aforementioned Sweet reference), with the intent of approaching the ideal zero relative velocity of the drop and air throughout the trajectory of the drop. The Giordano et al. patent introduced novel innovations to the flow pattern to achieve an almost zero relative velocity between the ink and air. First flow straightners are employed upstream from a hemispherical settling chamber wherein the fine scale turbulance generated by the air passing through porous screens would have time to dissipate before entering the tunnel duct. Next, the co-linear air stream was folded back on itself, effectively placing the source of charged drops outside the main air flow. This eliminated the generation of wake from the drop generator as practiced in Sweet's configuration. Finally, the cross-sectional area of the tunnel was constrained to substantially a constant. It has been discovered that maintaining the cross-sectional area of the tunnel (or duct) to a constant does not achieve an optimal configuration for a minimum relative velocity between the ink and the air.

SUMMARY OF THE INVENTION

In view of the above, it is a principle object of the present invention to provide an aspirator for a continuous stream ink jet printer wherein the relative velocity between the ink and the air approaches zero.

The aspirator according to the present invention is of the tunnel configuration type, and is characterized in that the tunnel cross-sectional area diverges from the inlet to the outlet, and the axial area gradient is inversely proportional to the intended velocity of air through the tunnel.

DETAILED DESCRIPTION OF THE INVENTION

Figure 1:
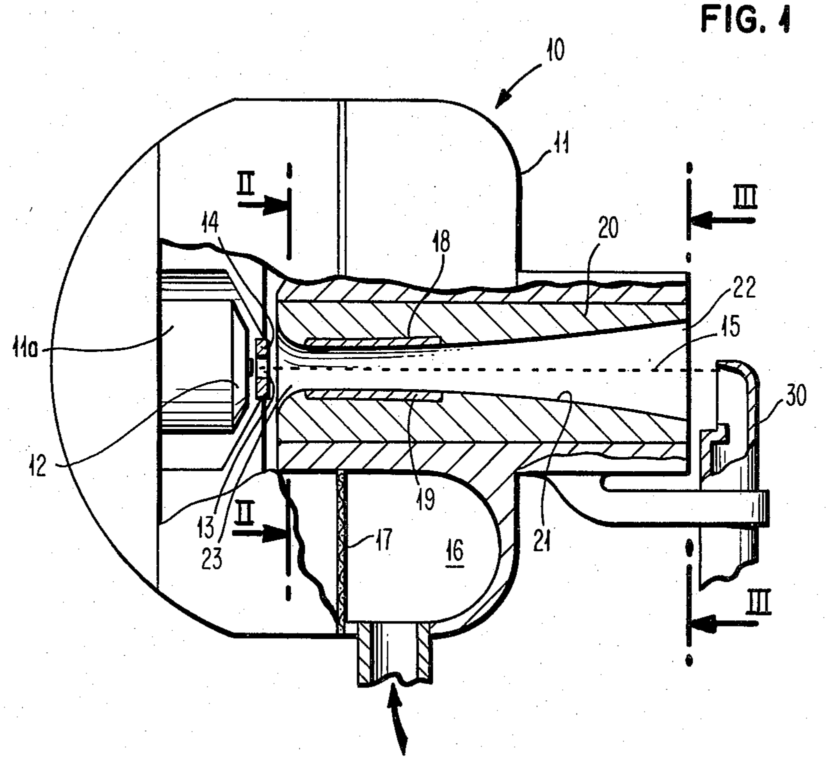
FIG. 1 is a fragmentary sectional side elevational view of an aspirator constructed in accordance with the present invention.

Referring now to the drawings, and especially FIG. 1 thereof, an aspirator 10 constructed in accordance with the present invention is illustrated therein. The aspirator includes, for example, a body portion 11 and a tunnel portion 20 which is surrounded and encapsulated by the body portion 11. A nozzle 12 mounted on the head **11*a* of an ink jet printer cooperates through an aperture 13 in a charge ring 14 to discharge a stream of ink drops into the inlet end 23 of the tunnel portion 20. As illustrated, ink drops 15 not receiving a charge by the charge ring or charge electrode 14 travel through a bore or a tunnel 21 into a gutter or the like 30 for recirculating the ink in a well known manner. The body portion 11 contains a cavity or settling chamber 16 into which air enters, for example from a blower (not shown), passes through a screen 17 and then into the inlet end 23 of the tunnel 21. Thus air enters the inlet 23 of the tunnel 21 and exits the outlet 22**.

In order to deflect individual ink drops from the stream 15, ink drops which have received a charge are deflected by an electric field formed between an upper deflection electrode 18 and a lower deflection electrode 19. In this manner, drops may be deflected above the gutter 30 and printed upon a print receiving medium (not shown), the height of the printed characters being dependent upon the charge received by the individual drops from the charge electrode 14.

In accordance with the invention and in order to maintain a uniform velocity within the tunnel 21, the axial area gradient is made inversely proportional to the intended velocity of air through the tunnel 21 so that the cross-sectional area of the outlet 22 is greater than the cross-sectional area of the inlet 23.

In order to insure that a substantially constant air velocity or movement through the tunnel is obtained, a direct mathematical modeling of the entire aspirator using a full three-dimensional Navier-Stokes equations of fluid mechanics may be employed. However, this is very complex and a half-factorial design experiment with a predetermined number of separate test models may be employed for experimental evaluation. In a factorial experiment, two values are selected for each of the dependent variables and these values are arranged in a combination which is orthogonal, that is their binary state product is a constant. The important test results and conclusions arrived at, as well as the variables and whether they were low or high in the half-factorial experiment are set forth below:

| Variable | Low (−) (CM.) | High (+) (CM.) |
|---|---|---|
| $L_1$ | 2.794 | 3.81 |
| A | .8 | 1 |
| W | 0.3048 | 0.381 |

More specifically Table 1 illustrates an expanded table of values where the numbers are expressed in inches except for dimension ratios.

TABLE 1

| State of (Hi/Lo) $L_1$ A W | $L_1$ (CM.) | A | W (CM.) | $H_2$ (CM.) |
|---|---|---|---|---|
| − − − | 2.794 | 0.8 | .3048 | .75438 |
| + − + | 3.81 | 0.8 | .381 | .60198 |
| − + + | 2.794 | 1 | .381 | .7493 |
| + + − | 3.81 | 1 | .3048 | .93726 |

With regard to FIGS. 2, 3 and 4, the definition of dimensions given in Table 1 and in the summarization appearing heretofore is set forth in the following listing. The variables defined in the following list are also useful in equations No. 1 and No. 2.

Figure 2:
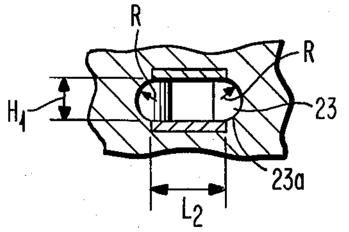
FIG. 2 is a fragmentary sectional view taken along line II—II of FIG. 1.
Figure 3:
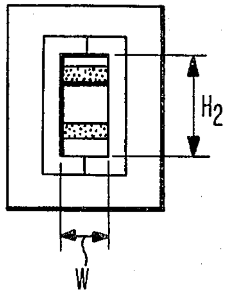
FIG. 3 is a fragmentary sectional view taken along line III—III of FIG. 1.

$L_1$ = Total length of tunnel 21
$A = A_2/A_1$ where $A_1$ = area of inlet, $A_2$ = area of outlet
W = Tunnel 21 exit width
$H_1$ = Tunnel inlet 23 height
$H_2$ = Tunnel outlet 22 height
$L_2$ = Shown in FIG. 2, the distance between centers of curvature for inlet side arcs 23a
R = Radius of inlet sides (see FIG. 2)
$2R = H_1 = 0.396$ cm
$L_2 = 0.396$ cm
$A_1 = 0.28032$ sq. cm.

In these experiments the state of the product of $L_1$, A and W is odd parity, and the inlet configuration illustrated best in FIG. 2, was held constant.

Figure 4:
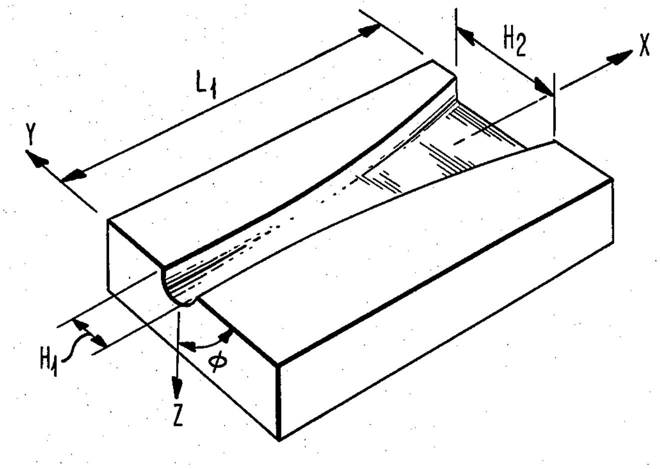
FIG. 4 is a fragmentary perspective view of one-half of a model of the tunnel portion of an aspirator showing various relationships explored in the specification.

The tunnels 21 with dimensions given in Table 1 were machined using a 3-axis, numerically controlled milling machine to cut mirror imaged left and right halves such as illustrated schematically in FIG. 4. The halves were assembled and the inlet was flared with a 0.3175 cm radius circular cutter.

Using the above defined parameters, the numerically controlled milling machine made 60 passes with a 0.15875 cm ball-end mill along the X axis, in three degree increments of the parameter variable $\phi$. The parametric equations for a cutter trajectory in the angle $\phi$ from the horizontal plane and for the Y and Z coordinates are given below as equations 1 and 2:

$$\text{Eq. 1: } Y(\phi) = ((H_2/2)\,\mathrm{COS}(\phi) - E)(X/L_1)^2 + ((H_1/2)\,\mathrm{COS}(\phi))(1 - (X/L_1)^2)$$

$$\text{Eq. 2: } Z(\phi) = (W/2)g(X) + ((S/2) + (H_1/2)\,\mathrm{Sin}(\phi))(1 - g(X))$$

$$\text{WHERE: } g(X) = \frac{((M + B + C)(X/L_1) - C(X/L_1)^2)}{M(X/L_1)^2 + B}$$

$M = WH_2/2 - (B + C + D)$
$B = WH_1/2 - D$
$C = SH_2/2 + \pi H_{12}H_2/8 - D$
$D = H_1S/2 + \pi H_1/8$
$E = (H_2 - H_1)/2$
$S = L_2$
X = axial variable along centerline of tunnel 21

The above equations are written for a parabolic family of curves, but it should be noted that any exponential or hyperbolic family of curves may be employed. Moreover, the function g(X) insures that any variation in cross-sectional area along the tunnel's X axis is linear.

Each of the tunnels were tested for aerodynamic performance with a constant temperature hot wire anemometer mounted on a fixture opposing the tunnel exit. The aerodynamic data taken on each of the tunnels comprise velocity profiles at various locations along the X axis both internal and external to the tunnel exit plane. From these data, two linear regressions were obtained. One regression considered the height of the uniform velocity section measured at the hypothetical print plane opposite the tunnel exit or outlet 22. (Uniform was taken to mean less than ±5% variation in the mean center line velocity).

The second regression employed the mean square variance of the axial velocity from the mean as a measure of the uniformity of the mean velocity along the aspirator. This kind of plot with the collected data showed that with the velocity of air entering the inlet 23 at, for example 800 cm/sec, the exit velocity rose to 1000 cm/sec. The data uncovered by this technique indicated that a diverging cross-sectional area tunnel rather than a constant area would reduce the overall variation of axial velocity from inlet to outlet.

It was apparent that the growth of boundary layers on the tunnel walls was choking off the flow which indicated the need for a slightly diverging area. Consequently a new series of tunnel shapes with diverging areas were constructed and evaluated. The important ones are set forth in Table 2 below:

TABLE 2

| $L_1$ (CM.) | A | W (CM.) | $H_2$ (CM.) |
|---|---|---|---|
| 2.794 | 1.2 | .3048 | 1.123 |
| 3.81 | 1.2 | .381 | .897 |

A linear programming model was applied to these new data with profile height and electrical sensitivity as given constraints and the objective function, i.e., axial velocity variance, was minimized. A 2.5—fold reduction in overall axial velocity variation, as compared with measured responses from the previous set of tunnels, was obtained with only a slight reduction in overall drop deflection sensitivity. No loss in usable velocity profile was observed. The characteristics of the tunnel obtained through the application of linear programming is summarized in Table 3.

TABLE 3

| Aspirator Tunnel Geometry | | |
|---|---|---|
| Nominal Air Speed 10 m/sec ~ 400 in/sec | (mm.) | (variable) |
| Total length | (38.0) | ($L_1$) |
| Area ratio | 1.2 | ($A_2/A_1$) |
| Exit width | (3.43) | (W) |
| Entrance height | (4) | ($H_1$) |
| Entrance width | (8) | ($L_2 + H_1$) |
| Exit height | (10) | ($H_2$) |

Figure 5:
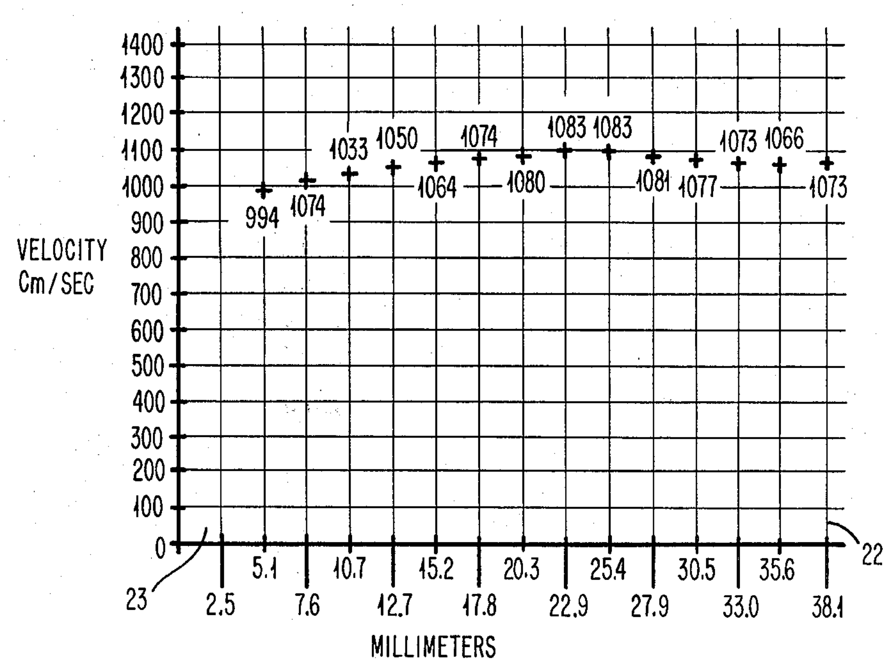
FIG. 5 is an axial velocity profile plot of an actual aspirator with velocity plotted on the ordinate axis, and the distance in from the inlet of the tunnel plotted on the abscissa.

A true axial velocity profile plot of the aspirator tunnel geometry set forth in Table 3 is illustrated in FIG. 5 with the ordinate dimensions being the velocity of the air measured in centimeters/second and the abscissa being the position along the axis of the tunnel measured from the entrance 23 to the exit 22, the dimension there being in mm.

At a mean velocity of approximately 1000 cm/sec, therefore, the area ratio (A) of 1.2 was found to be a preferred embodiment.

In practice, the physical form of air aspirator is strongly influenced by the demands placed on the ink jet system. For example, the length, height, and flare rate are directly related to the required electrical sensitivity, the print size, and the ink jet speed. In general, an optimal aspirator results when length and height are selected and flare rate allowed to vary until the variation of air speed throughout the tunnel is minimized. This is obtained by increasing the cross-sectional area from inlet to exit.

At one end of the spectrum, the demand for an aspirator with good electrical sensitivity, limited print height, and high speed leads to a long, modestly flared duct constraining a high speed air flow. At the onset of unstable flow, on the order of 5000–6000 cm/sec, an area flare ratio (A) on the order of 1.05 yields an optimal aspirator.

At the other extreme, the demand for an aspirator with a moderate electrical sensitivity, large print heights, and low speed leads to a long, strongly flared duct constraining a low speed air flow. Under these conditions, an area flare ratio (A) on the order of 1.5–2 is indicated. The limiting value is restricted by the onset of flow separation which in turn depends on the convexity of the duct and the flow Reynold's number. Thus, depending on the particular application as aspirator must support, the physical geometry will vary. Regardless of the specific implementation, one general principal prevails: The difference between the ink and air speeds must be minimized for an optimal aspirator. This is accomplished by increasing the aspirator duct cross-sectional area from inlet to exit. Based on physical constraints of fluid flow, a useful range of area flare ratios (A) should be bounded between 1 and 2. In actuality, a practical aspirator is obtained with flare ratios on the order of 1.1 to 1.6.

Moreover, from the tests conducted it was determined that the axial area gradient is inversely proportional to the velocity of air through the tunnel. This means that although the shape of the inlet and outlet of the tunnel 21 are different, the cross-sectional area of the tunnel must diverge, the divergence being at a rate that is inversely proportional to the air (or the ink) velocity. The term ink may be used interchangeably because the object is to achieve zero relative movement between the air and ink.

Thus the aspirator design of the present invention when used in conjunction with an ink jet printer achieves the desired effect of creating an air movement through the tunnel which is substantially constant so that it may match the velocity of the ink traversing the tunnel thereby minimizing the effects of relative air movement on the ink drops as they pass through the aspirator tunnel.

Although the invention has been described with a certain degree of particularity, it is understood that the present disclosure has been made only by way of example and that numerous changes in the details of construction and the combination and arrangement of parts may be made without departing from the spirit and scope of the invention as hereinafter claimed.

What is claimed is:

1. An aspirator (10) for a continuous stream ink jet printer in which air and ink pass through the aspirator substantially coaxially and at a velocity relative to one another to substantially inhibit the necessity for aerodynamic ink to air velocity correction, said aspirator (10) being of the type comprising a tunnel (20) having an air and ink stream inlet (23) and outlet (22), and a bore (21) in said tunnel interconnecting said inlet (23) and outlet (24); said aspirator being characterized in that:

said bore (21) increases in cross-sectional area from said inlet (23) to said outlet (22), the axial area gradient being inversely proportional to the intended velocity of air through the tunnel.

2. An aspirator for a continuous stream ink jet printer in accordance with claim 1 characterized in that said cross-sectional area of said outlet (22) is between 1.05 and 2 times the cross-sectional area of said inlet (23).

3. An aspirator in accordance with claim 2 characterized in that said cross-sectional area of said outlet (22) is 1.2 times the cross-sectional area of said inlet (23).

4. An aspirator for a continuous stream ink jet printer in accordance with claim 2 characterized in that said cross-sectional area of said outlet (22) is between 1.1 and 1.6 times the cross-sectional area of said inlet (23).

* * * * *